J. R. FLANNERY.
STAY BOLT STRUCTURE.
APPLICATION FILED NOV. 21, 1916.
1,252,334.
Patented Jan. 1, 1918.
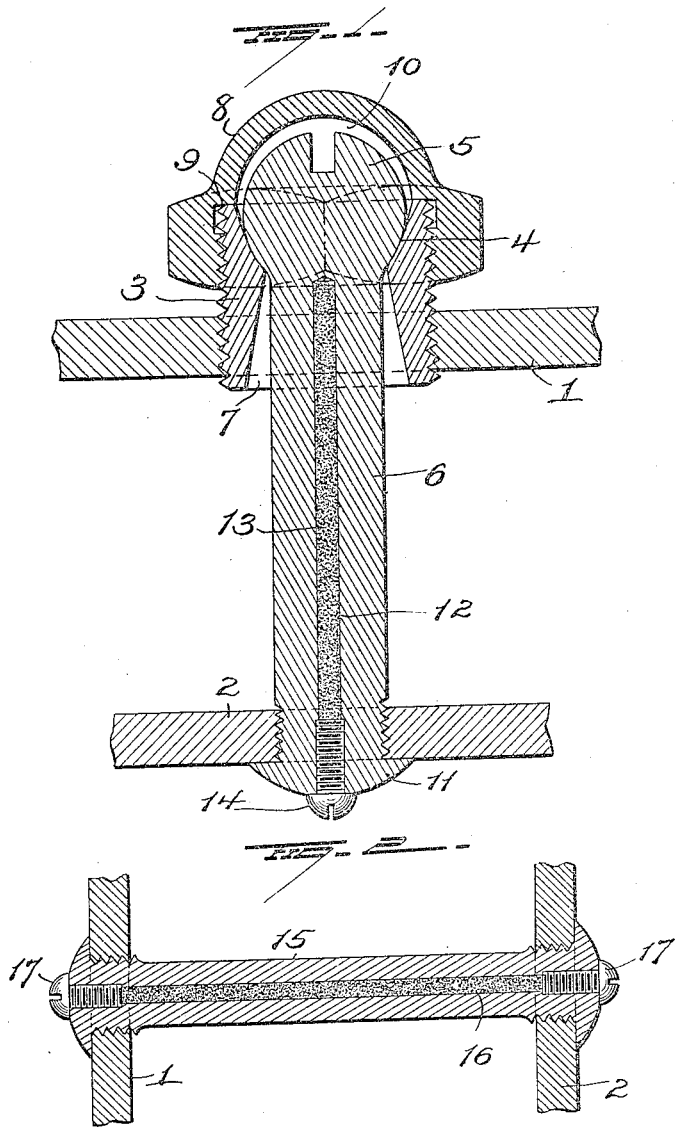

UNITED STATES PATENT OFFICE.

JOHN ROGERS FLANNERY, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,252,334.  Specification of Letters Patent.  Patented Jan. 1, 1918.

Application filed November 21, 1916. Serial No. 132,610.

*To all whom it may concern:*

Be it known that I, JOHN ROGERS FLANNERY, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in stay-bolt structures, such as are employed in boilers,—the object of the invention being to provide simple and efficient means whereby the condition of the bolt may be determined without removing the same, by merely examining the contents of the tell-tale hole.

A further object is to provide material in the tell-tale hole of a stay bolt which shall be caused to harden by the action of water which might enter said tell-tale hole in the event the bolt should become broken or ruptured, and thus indicate such condition of the bolt.

With these objects in view, the invention consists in certain novel stay bolt structures as hereinafter set forth and pointed out in the claims.

In the accompanying drawings; Figure 1 is a sectional view showing one embodiment of my invention, and Fig. 2 is a view showing another embodiment of the invention.

1 represents an outer boiler sheet and 2 an inner boiler sheet. In the construction shown in Fig. 1 of the drawings, the outer boiler sheet is made with a hole having a threaded wall for the reception of an exteriorly threaded bearing sleeve 3, the inner wall of the latter being formed with a curved bearing face 4 for the accommodation of the spherical or rounded head 5 of a stay bolt 6 and a portion of the bore of the bearing sleeve is made flaring as at 7 to permit of lateral movement of the bolt. The head of the bolt may be inclosed by means of a cap 8 which screws onto the sleeve 3 and may be formed with a shoulder 9 to engage the end of the sleeve,—the interior configuration of said cap being such as to form a clearance space 10. The inner end of the bolt 6, in the structure shown in Fig. 1, may be threaded to pass through a suitable hole in the inner boiler sheet 2, and may be upset, as shown at 11.

The bolt is provided with a bore 12 which, in the embodiment of the invention shown in Fig. 1, may extend from the inner end of the bolt to a point in proximity to the head 5 thereof,—the outer end of said bore thus being closed. A material 13 (preferably in a comminuted condition) which will crystallize or solidify upon contact of water therewith, is inserted into the bore 12 through its open end. Such material may consist, for example, of a mixture of cement, plaster of Paris and salt, but any material which will be so sensitive to the action of water that it will be caused to crystallize or harden thereby, may be employed.

In the embodiment of the invention shown in Fig. 1, the inner end of the bore of the bolt may be closed by a removable plug which, in the present instance is shown as consisting of a screw 14.

In Fig. 2 of the drawing I have shown a fixed bolt 15 having a bore 16 extending entirely through the same from end to end, and containing the material 13. In this construction, both ends of the bore may be closed by removable plugs in the form of screws 17.

To test the bolt, the attendant will examine the contents of the bore. If he finds the material to be in powdered or comminuted condition, he will know that the bolt is good. In the event that the bolt has become broken so as to admit water into the bore, such water will have so acted upon the material as to cause the same to crystallize or solidify. Upon examination, the attendant will discover this solidified condition of the material and it will denote to him that the bolt is defective.

Having fully described my invention, what I claim as new and desire to secure by Letters-Patent, is:

1. A stay bolt for boilers, having a bore containing material which will become crystallized or hardened by the action of water.

2. A stay bolt having a bore containing material which will become crystallized or hardened by the action of water, and a removable plug closing said bore.

3. A stay bolt having a bore extending through the same and containing material which will crystallize by the action of water, said material being accessible from either end of the bolt.

In testimony whereof, I have signed this specification in the presence of two subscribing witnesses.

JOHN ROGERS FLANNERY.

Witnesses:
 ETHEL I. DODDS,
 WM. T. MCNABB.

Copies of this patent may be obtained for five cents each, by addressing the "Commissioner of Patents, Washington, D. C."